Jan. 3, 1950        E. E. STIPSKY        2,493,043
SHIP'S COMPASS MOUNTING
Filed July 25, 1945
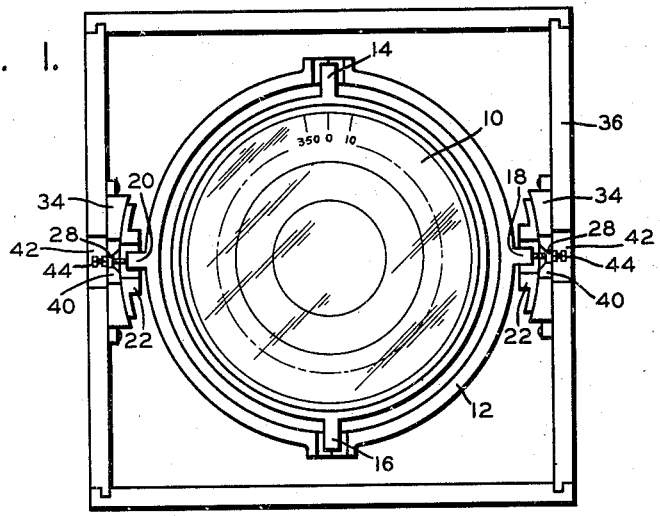
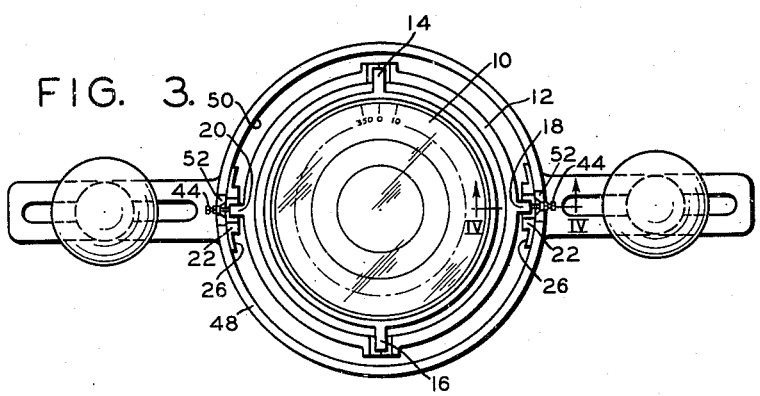
INVENTOR
EDWARD E. STIPSKY
BY Ralph L. Chappell
ATTORNEY Patented Jan. 3, 1950

2,493,043

UNITED STATES PATENT OFFICE 2,493,043

SHIP'S COMPASS MOUNTING

Edward E. Stipsky, United States Navy,
Hooper, Nebr.

Application July 25, 1945, Serial No. 607,069

4 Claims. (Cl. 248—299)

(Granted under the act of March 3, 1883, as
amended April 30, 1928; 370 O. G. 757)

This invention relates to a ship's compass mounting and more particularly to a binnacle construction which permits angular adjustment of the compass in azimuth with respect to the binnacle.

Binnacles of either the pedestal or box type are commonly installed on a ship with the supports for the gimbal ring, on which the compass rests, in such a position as to cause the lubber's line of the compass to be as nearly coincident with a line extending directly fore and aft as possible. Owing to unavoidable inaccuracies in this operation, as well as to inaccuracies in the gimbal ring arrangement, the lubber's line of the compass is frequently misplaced in azimuth by varying amounts up to 5 degrees.

It is impracticable to attempt to correct this error by repositioning the binnacles themselves or by repositioning the gimbal ring supports in either type of binnacle, because the new positions of the fastenings in either case would partially overlap the old positions. Moreover, since the box type of binnacle is parallel sided, any attempt to move the gimbal ring supports oppositely to each other fore and aft, in order to reposition the lubber's line angularly, would result in disalining the pivotal connection between the gimbal ring and the supports.

The above mentioned error cannot be removed in the compensation of the compass. If the error is relatively great, an allowance should be made for it in determining any course to be sailed, or any bearing obtained by the use of the compass if the ship's heading is used as a reference. Prior to this invention, this error has often been disregarded to the detriment of accurate navigation. Or if it has been considered, another correction has been introduced into the computation of a course or bearing which is subject to a double error if the correction is applied the wrong way.

In view of the foregoing, it is an object of the invention to provide an improved compass mounting which permits accurate adjustment of the compass in azimuth with respect to a binnacle of either the pedestal or box type and without impairing the free pivotal mounting of the gimbal ring on its supports.

To this end, the invention provides as one feature thereof, seats on the binnacle, adapted to receive the gimbal ring supports and along which the supports are adjustable in azimuth, the seats being formed concentrically with the axis of the compass card. Accordingly, an angular adjustment of the lubber's line in either direction may be effected by making similar, angular adjustments of the supports on their seats. It is evident, moreover, that the necessary coaxial relation between the supports and the gimbal ring is not disturbed by such an adjustment.

The invention also provides, as another feature thereof, adjustable abutments for limiting movement of the gimbal ring in either direction lengthwise of its pivotal axis, these abutments being carried by the supports so that, regardless of any adjustment of the supports, the relation between the abutments and the gimbal ring will be unchanged.

With the above and other objects and features in view, the invention will now be described with reference to the accompanying drawings which represent illustrative embodiments of the invention and will be pointed out in the claims.

In the drawings:

Fig. 1 is a plan view of a compass mounting, in a box type of binnacle, embodying the invention;

Fig. 2 is a fragmentary perspective view of the improved gimbal support and seat therefor provided by the invention as mounted on the binnacle shown in Fig. 1;

Fig. 3 is a plan view illustrating the improved compass mounting in a pedestal type of binnacle; and Fig. 4 is a fragmentary sectional view, the section being taken along the line IV—IV in Fig. 3.

Referring to Fig. 1, a compass 10 is pivotally mounted on a gimbal ring 12 by the usual trunnions 14, 16 which extend outwardly from opposite sides of the body of the compass and are received in V-shaped grooves in the ring. Trunnions 18, 20 extend outwardly from opposite sides of the gimbal ring 12 mid-way between the trunnions 14, 16. The trunnions 18, 20 are arranged to pivot on supports 22, 22 each of which comprises a notched lug 24 (Fig. 2), in which one of the trunnions is seated, a flange 26, and an arm 28.

Each support 22 is secured by screws 30, extending through horizontally elongated slots 32 in its flange 26, to a seat 34, which in turn is fastened to the box-type of binnacle 36 by screws 38. The cooperating surfaces of the seats 34 and flanges 26 are similarly curved and are disposed in a common cylindrical surface concentric with the axis of the compass card when the latter is in its normal, horizontal position.

It will now be apparent that a suitable angular adjustment of the compass in azimuth may be made to correct an error in the position of its lubber's line merely by loosening the screws 30 and sliding the supports 22 in the appropriate direction on the seats 34. By moving the supports 22 equal amounts from any original position in which the trunnions 18 and 20 are properly seated in the lugs 24, the free pivotal connection between the supports and the gimbal ring 12 is not impaired, since the lugs are disposed diametrically opposite to each other in any final position of adjustment.

The seats 34 and the sides of the binnacle 36 are notched as at 40 and 42 respectively to provide clearance for the arms 28.

In order to prevent chafing between the sides of the gimbal ring 12 and the lugs 24, movement of the ring lengthwise by its pivotal axis is limited in both directions by screw abutments 44, one of which is threaded into the upper end of each arm 28. Each screw serves as a stop for its associated trunnion 18, 20, and when once adjusted is held in adjusted position by a chuck nut 46. Since the arms 28, in which the screws 44 are threaded, are integral with the supports 22, adjustment of the latter does not change the relation between the screws and the trunnions 18.

For the sake of clarity of the description, reference characters as employed above have been applied to the compass mounting illustrated in Fig. 3 where duplication of the same parts occurs. This figure represents the application of the invention to a pedestal type of binnacle 48 on the upper rim of which the supports 22 are directly mounted. In this embodiment of the invention, the inner surface 50 of the rim of the binnacle provides seats for the supports 22, which seats, as before, are concentric with the axis of the compass card. The rim of the binnacle is notched as at 52 to provide the clearance for the arms 28 necessitated by their adjustment, and also has tapped holes adapted to receive the screws 30 by which the supports 22 are secured to the binnacle.

In both embodiments of the invention, the compass 10 can easily be adjusted in azimuth to bring its lubber's line into coincidence with a line extending directly fore and aft simply by making the above described adjustment of the supports 22. Thus, there is obviated any error in the position of the compass which would complicate any computation in which a compass reading is involved. Moreover, owing to the concentric adjustability of the supports 22, a condition of perfect alignment between the trunnions 18 and the supports 22 is always obtainable for any required position of the lubber's line.

The invention described herein may be manufactured and used by or for the Government of the United States of America for Government purposes without the payment of any royalty thereon or therefor.

What is claimed is:

1. In a ship's compass mounting including a binnacle and a gimbal ring, a pair of supports on which said ring is pivotally mounted, a pair of seats associated with said binnacle, said supports and seats having cooperating surfaces disposed in a common cylindrical surface which is concentric with the axis of the compass card, said supports being adjustable in azimuth along said seats angularly to adjust the lubber's line of the compass without disaligning the pivotal connection between said ring and supports, and means for securing said supports in adjusted position in said seats.

2. In a ship's compass mounting including a binnacle and a gimbal ring, a pair of supports on which said ring is pivotally mounted, a pair of seats associated with said binnacle, said supports and seats having cooperating cylindrical surfaces each of which is formed concentrically with the axis of the compass card, and fasteners for securing said supports to said seats, said supports being slotted to provide horizontally extending bearing surfaces for said fasteners whereby said supports may be adjusted in azimuth with respect to said seats.

3. In a ship's compass mounting including a binnacle and a gimbal ring, a pair of supports on which said ring is pivotally mounted, each of said supports comprising an arm and an abutment threaded in said arm for adjustably limiting movement of said gimbal ring with respect to said supports in either direction lengthwise of the pivotal axis of said ring, seats in which said supports are mounted, said seats and supports having cooperating surfaces disposed in a common cylindrical surface concentric with the axis of the compass card, and fasteners for securing said supports to said seats, said supports being slotted to provide horizontally extending bearing surfaces for said fasteners whereby said supports may be adjusted in azimuth on said seats.

4. In a ship's compass mounting including a binnacle and a gimbal ring, a pair of supports on which said ring is pivotally mounted, each of said supports including an integrally connected arm extending radially of the pivotal axis of said gimbal ring, a screw threaded in said arm for adjustably limiting movement of said gimbal ring with respect to said supports in either direction lengthwise of the pivotal axis of said ring, seats rigidly attached to said binnacle in which said supports are mounted, said seats and said supports having cooperating areas disposed in a common cylindrical surface concentric with the axis of the compass card, said seats and said binnacle having clearance notches cut therein to allow movement of said arm and screw, and screws for adjustably securing said supports to said seats, said supports being slotted to provide bearing surfaces for said screws whereby said supports may be adjusted in azimuth on said seats.

EDWARD E. STIPSKY.

REFERENCES CITED

The following references are of record in the file of this patent:

FOREIGN PATENTS

| Number | Country | Date |
|---|---|---|
| 196,682 | Canada | of 1920 |